(12) United States Patent
Kitano et al.

(10) Patent No.: US 12,080,885 B2
(45) Date of Patent: Sep. 3, 2024

(54) POSITIVE ELECTRODE ACTIVE MATERIAL FOR NON-AQUEOUS ELECTROLYTE SECONDARY BATTERY AND PRODUCTION METHOD THEREOF

(71) Applicant: NICHIA CORPORATION, Anan (JP)

(72) Inventors: Katsuyuki Kitano, Anan (JP); Hayaki Matsumoto, Anan (JP)

(73) Assignee: NICHIA CORPORATION, Anan (JP)

( * ) Notice: Subject to any disclaimer, the term of this patent is extended or adjusted under 35 U.S.C. 154(b) by 43 days.

(21) Appl. No.: 18/046,905

(22) Filed: Oct. 14, 2022

(65) Prior Publication Data
US 2023/0112283 A1  Apr. 13, 2023

Related U.S. Application Data

(63) Continuation of application No. 17/102,646, filed on Nov. 24, 2020, now Pat. No. 11,515,533.

(30) Foreign Application Priority Data

Nov. 29, 2019 (JP) ................... 2019-217181

(51) Int. Cl.
*H01M 4/505* (2010.01)
*C01G 53/00* (2006.01)
(Continued)

(52) U.S. Cl.
CPC ............ *H01M 4/505* (2013.01); *C01G 53/50* (2013.01); *H01M 4/525* (2013.01);
(Continued)

(58) Field of Classification Search
CPC .. H01M 4/505; H01M 4/525; H01M 10/0525; H01M 2004/021; H01M 2004/028; C01G 53/50
See application file for complete search history.

(56) References Cited

U.S. PATENT DOCUMENTS 10,622,629 B2   4/2020  Ogawa et al.
11,515,533 B2 * 11/2022  Kitano ................... C01G 53/42
(Continued)

FOREIGN PATENT DOCUMENTS

AU   2017202103 A1   10/2017
JP   2000515478 A    11/2000
(Continued)

OTHER PUBLICATIONS

International Search Report issued in corresponding International Application No. PCT/JP2020/039743 on Dec. 28, 2020, 3 pages.
(Continued)

*Primary Examiner* — Stewart A Fraser
(74) *Attorney, Agent, or Firm* — Hunton Andrews Kurth LLP

(57) ABSTRACT

Provided is a positive electrode active material for a non-aqueous electrolyte secondary battery, the active material including a lithium-transition metal composite oxide containing lithium, nickel, cobalt, and manganese, having a layered structure, having a ratio $D_{50}/D_{SEM}$ of from 1 to 4, and having a ratio of a number of moles of nickel to a total number of moles of metals other than lithium of greater than 0.8 and less than 1, a ratio of a number of moles of cobalt to the total number of moles of metals other than lithium of less than 0.2, a ratio of a number of moles of manganese to the total number of moles of metals other than lithium of less than 0.2, and a ratio of the number of moles of manganese to a sum of the number of moles of cobalt and the number of moles of manganese of less than 0.58.

20 Claims, 4 Drawing Sheets

(51) Int. Cl.
   *H01M 4/02*   (2006.01)
   *H01M 4/525*  (2010.01)
   *H01M 10/0525* (2010.01)

(52) U.S. Cl.
   CPC ..... *H01M 10/0525* (2013.01); *C01P 2004/03* (2013.01); *H01M 2004/021* (2013.01); *H01M 2004/028* (2013.01)

(56) References Cited

U.S. PATENT DOCUMENTS

| | | |
|---|---|---|
| 2011/0287321 A1 | 11/2011 | Hiraki et al. |
| 2012/0270107 A1 | 10/2012 | Toya et al. |
| 2017/0288223 A1 | 10/2017 | Ogawa et al. |
| 2019/0103605 A1 | 4/2019 | Saitou et al. |
| 2020/0203728 A1 | 6/2020 | Ogawa et al. |
| 2020/0251732 A1 | 8/2020 | Ryoshi et al. |
| 2021/0043918 A1 | 2/2021 | Maeyama et al. |

FOREIGN PATENT DOCUMENTS

| | | | |
|---|---|---|---|
| JP | 2002075367 A | 3/2002 | |
| JP | 2003292322 A | 10/2003 | |
| JP | 2006012433 A | 1/2006 | |
| JP | 2011116580 A | 6/2011 | |
| JP | 2011146390 A | 7/2011 | |
| JP | 2016115658 A | 6/2016 | |
| JP | 2017147054 A | 8/2017 | |
| JP | 2017188444 A | 10/2017 | |
| JP | 2017188445 A | 10/2017 | |
| JP | 2017226576 A | 12/2017 | |
| JP | 2018063951 A | 4/2018 | |
| JP | 2019160573 A | 9/2019 | |
| WO | 1998005592 A1 | 2/1998 | |
| WO | 2010090185 A1 | 8/2010 | |
| WO | 2017169129 A1 | 10/2017 | |
| WO | 2017169184 A1 | 10/2017 | |
| WO | 2018221664 A1 | 12/2018 | |
| WO | 2019193857 A1 | 10/2019 | |
| WO | 2020202745 A1 | 10/2020 | |

OTHER PUBLICATIONS

Notice of Allowance, United States Patent and Trademark Office, issued to U.S. Appl. No. 17/102,646 on Jul. 15, 2022, 8 pages.

* cited by examiner

POSITIVE ELECTRODE ACTIVE MATERIAL FOR NON-AQUEOUS ELECTROLYTE SECONDARY BATTERY AND PRODUCTION METHOD THEREOF

CROSS-REFERENCE TO RELATED APPLICATIONS

This is a continuation application of U.S. patent application Ser. No. 17/102,646, filed Nov. 24, 2020, which claims priority to Japanese Patent Application No. 2019-217181, filed on Nov. 29, 2019, the disclosures of which are hereby incorporated by reference in their entireties.

BACKGROUND

The present disclosure relates to a positive electrode active material for a non-aqueous electrolyte secondary battery and a production method thereof.

Electrode active materials for a non-aqueous electrolyte secondary battery containing a nickel cobalt lithium aluminum oxide with a high ratio of nickel are used in large power equipment, such as automobiles, and these electrode active materials are desired to have more improved output characteristics. To obtain higher output characteristics, it is considered to be effective to have a secondary particle structure formed by aggregation of many primary particles (hereinafter also referred to as aggregated particles). However, positive electrode active materials containing aggregated particles may have cracks in the aggregated particles when, for example, pressure is applied in forming electrodes, or by expansion and contraction during charge and discharge of the electrode active materials, and may fail to achieve desired output characteristics. In view of this, some methods of producing a positive electrode active material containing lithium transition metal oxide particles composed of single particles alone, or composed of secondary particles each composed of a small number of primary particles (hereinafter, collectively referred to as single particle-type) have been proposed (refer to, for example, Japanese Patent Application Publication No. 2017-188444).

Also proposed is a method of producing a lithium-transition metal composite oxide containing nickel occupying 96.0% or more of 3a lithium sites. The percentage is obtained by Rietveld analysis using a crystallization accelerator containing an alkali metal other than lithium. The lithium-transition metal composite oxide thus produced is said to have improved cycle characteristics without sacrificing charge and discharge capacities (refer to, for example, Japanese Patent Application Publication No. 2016-115658).

SUMMARY

A first aspect of the present disclosure is a positive electrode active material for a non-aqueous electrolyte secondary battery containing a lithium-transition metal composite oxide that contains lithium, nickel, cobalt, and manganese, and has a layered structure. The lithium-transition metal composite oxide has a ratio $D_{50}/D_{SEM}$ of from 1 to 4, wherein $D_{50}$ is a 50% particle diameter in a cumulative particle size distribution on a volumetric basis and $D_{SEM}$ is an average particle diameter based on electron microscope observation, and has a composition with a ratio of the number of moles of nickel to the total number of moles of metals other than lithium of greater than 0.8 and less than 1, a ratio of the number of moles of cobalt to the total number of moles of the metals other than lithium of less than 0.2, a ratio of the number of moles of manganese to the total number of moles of the metals other than lithium of less than 0.2, and a ratio of the number of moles of manganese to a sum of the number of moles of cobalt and the number of moles of manganese of less than 0.58.

A second aspect of the present disclosure is a method of producing a positive electrode active material for a non-aqueous electrolyte secondary battery. The method includes preparing a composite containing nickel, cobalt, and manganese as metal components, wherein the ratio of a number of moles of nickel to the total number of moles of the metal components is greater than 0.8 and less than 1, the ratio of the number of moles of cobalt to the total number of moles of the metal components is less than 0.2, the ratio of the number of moles of manganese to the total number of moles of the metal components is less than 0.2, and the ratio of the number of moles of manganese to the sum of the number of moles of cobalt and the number of moles of manganese is less than 0.58; mixing the composite, a lithium compound, and an alkali metal compound containing an alkali metal other than lithium and having a melting point of 400° C. or less to obtain a lithium mixture; heat treating the lithium mixture at a temperature of from 650° C. to 800° C. to obtain a heat-treated product; dry-dispersion treating the heat-treated product to obtain a first dispersed product; and contacting the first dispersed product with a liquid medium, and then removing at least part of the liquid medium to obtain a lithium-transition metal composite oxide. The lithium-transition metal composite oxide has a ratio $D_{50}/D_{SEM}$ of from 1 to 4, wherein $D_{50}$ is a 50% particle diameter in a cumulative particle size distribution on a volumetric basis and $D_{SEM}$ is an average particle diameter based on electron microscope observation.

According to an aspect of the present disclosure, a positive electrode active material for a non-aqueous electrolyte secondary battery that may form a non-aqueous electrolyte secondary battery having a high initial efficiency and durability may be provided. According to another aspect of the present disclosure, a method of producing the positive electrode active material for a non-aqueous electrolyte secondary battery may be provided.

DETAILED DESCRIPTION

Figure 1:
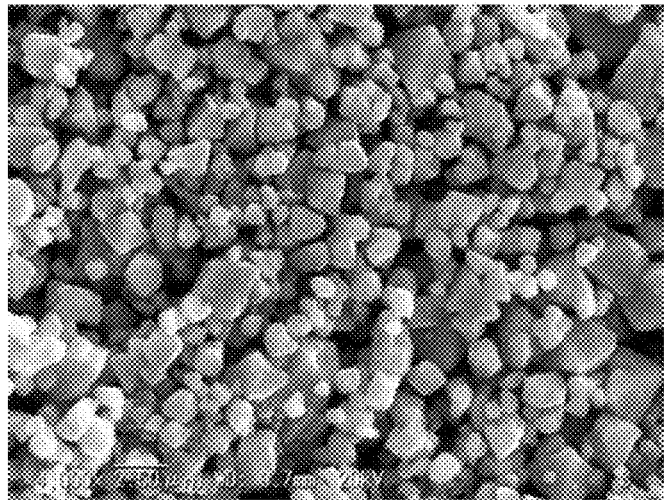
FIG. 1 is an example of a scanning electron microscope (SEM) image of a positive electrode active material according to Example 1.

As used herein, the term "step" means not only an independent step but also a step which cannot be clearly distinguished from the other steps but that can achieve the desired object. When a plurality of substances corresponding to a component are present in a composition, the amount of the component means the total amount of the corresponding substances present in the composition unless otherwise specified. The embodiments of the present invention will now be described in detail. However, the embodiments described below are mere examples of the positive electrode active material for a non-aqueous electrolyte secondary battery and the production method thereof for embodying the technical concept of the present invention, and the present invention is not limited to the positive electrode active material for a non-aqueous electrolyte secondary battery and the production method thereof described below.

Positive Electrode Active Material for Non-Aqueous Electrolyte Secondary Battery The positive electrode active material for a non-aqueous electrolyte secondary battery (hereinafter, also simply referred to as positive electrode active material) may contain layer-structured lithium-transition metal composite oxide particles containing lithium, nickel, cobalt, and manganese in its composition, and may have a ratio of a 50% particle diameter $D_{50}$ in a cumulative particle size distribution on a volumetric basis to an average particle diameter $D_{SEM}$ based on electron microscope observation, or $D_{50}/D_{SEM}$, of from 1 to 4 (hereinafter, also simply referred to as composite oxide particles). The lithium-transition metal composite oxide (hereinafter, also simply referred to as composite oxide) forming the composite oxide particles may have a composition with a ratio of the number of moles of nickel to the total number of moles of the metals other than lithium of greater than 0.8 and less than 1, a ratio of the number of moles of cobalt to the total number of moles of the metals other than lithium of less than 0.2, a ratio of the number of moles of manganese to the total number of moles of the metals other than lithium of less than 0.2, and a ratio of the number of moles of manganese to the sum of the number of moles of cobalt and the number of moles of manganese of less than 0.58.

The positive electrode active material containing the single particle-type lithium-transition metal composite oxide particles having a composition with a ratio of the number of moles of nickel of the predetermined value or more, and a ratio of the number of moles of manganese to the sum of cobalt and manganese of less than the predetermined value, and having a ratio of $D_{50}/D_{SEM}$ of within the predetermined range may achieve, when included in a non-aqueous electrolyte secondary battery, both superior initial efficiency and durability at a high level. This is probably because the lithium-transition metal composite oxide particles of the present disclosure have, for example, a more stable crystal structure than single particle-type lithium-transition metal composite oxide particles containing no manganese in the composition. Also, the lithium-transition metal composite oxide particles of the present disclosure have more improved initial efficiency and durability than single particle-type lithium-transition metal composite oxide particles having a ratio of the number of moles of manganese to the sum of cobalt and manganese of the predetermined value or more, probably because manganese acts less as resistance in the lithium-transition metal composite oxide particles of the present disclosure.

The composite oxide particles contained in the positive electrode active material may have a ratio $D_{50}/D_{SEM}$ of from 1 to 4. A ratio $D_{50}/D_{SEM}$ of 1 indicates that the particles are composed of single particles alone, and the closer the ratio becomes to 1, the smaller the number of primary particles constituting the composite oxide particles. The ratio $D_{50}/D_{SEM}$ is preferably less than 4 to improve durability. The lower limit of the ratio $D_{50}/D_{SEM}$ may be, for example, 1.1 or more. The number of primary particles contained in the composite oxide particles may be, for example, 30 or less, preferably 14 or less, and more preferably 7 or less. The lower limit of the number of primary particles contained in the composite oxide particles may be 1 or more.

The composite oxide particles may have an average particle diameter $D_{SEM}$ based on electron microscope observation of, for example, from 1 μm to 7 μm in consideration of durability. In consideration of output density and electrode plate filling, the $D_{SEM}$ is preferably 1.1 μm or more, more preferably 1.2 μm or more, and still more preferably 1.3 μm or more. The $D_{SEM}$ is also preferably 5 μm or less, more preferably 4 μm or less, still more preferably 3 μm or less, particularly preferably 2 μm or less, and most preferably 1.6 μm or less.

The average particle diameter $D_{SEM}$ based on electron microscope observation may be obtained by the procedure including: observing particles using a scanning electron microscope (SEM) at a magnification in the range of from 1000 to 10000 times in accordance with the particle diameters, selecting 100 primary particles whose outlines are discernible, calculating spherical equivalent diameters of the selected particles using an image treatment software, and obtaining an arithmetic mean value of the resulting spherical equivalent diameters. Here, that the outline of the particle is discernible means that outlines of the primary particle can be traced on the SEM image.

The composite oxide particles may have a 50% particle diameter $D_{50}$ of, for example, from 1 μm to 15 μm. In consideration of output density, the $D_{50}$ is preferably 1.5 μm or more, more preferably 2.5 μm or more, still more preferably 3 μm or more, particularly preferably 3.2 μm or more, and most preferably 4 μm or more. The $D_{50}$ is also preferably 8 μm or less, more preferably 6 μm or less, still more preferably 5.6 μm or less, and particularly preferably 5.4 μm or less.

The 50% particle diameter $D_{50}$ is obtained as a particle diameter at a cumulative volume of 50% from small diameter side in a cumulative particle size distribution on a volumetric basis measured in wet conditions using, for example, a laser diffraction particle size distribution analyzer. Similarly, a 90% particle diameter $D_{90}$ and a 10% particle diameter $D_{10}$ described later are obtained as a particle diameter at a cumulative volume of 90% and 10%, respectively.

In the composite oxide particles, the ratio of a 90% particle diameter $D_{90}$ to a 10% particle diameter $D_{10}$ in a cumulative particle size distribution on a volumetric basis, or $D_{90}/D_{10}$, indicates, for example, distribution of the particle sizes, and the smaller the ratio, the more uniform are the particle diameters of the particles. The ratio $D_{90}/D_{10}$ may be, for example, 4.5 or less. The ratio $D_{90}/D_{10}$ is, in consideration of output density, preferably 4 or less, and more preferably 3.9 or less. The lower limit of the ratio $D_{90}/D_{10}$ is, for example, 1.2 or more.

The lithium-transition metal composite oxide (hereinafter, also referred to as composite oxide) forming the composite oxide particles may contain lithium (Li), nickel (Ni), cobalt (Co), and manganese (Mn) in its composition, and may have a layered structure. The composite oxide may have a composition where the ratio of the number of moles of nickel to the total number of moles of the metals other than lithium is, for example, greater than 0.8 and less than 1. The ratio of the number of moles of nickel to the total number of moles of the metals other than lithium is preferably 0.82 or more, more preferably 0.85 or more, and particularly preferably 0.87 or more. The ratio of the number of moles of nickel to the total number of moles of the metals other than lithium is preferably 0.92 or less, and more preferably 0.9 or less. The composite oxide may have a composition where the ratio of the number of moles of cobalt to the total number of moles of the metals other than lithium is, for example, less than 0.2. The ratio of the number of moles of cobalt to the total number of moles of the metals other than lithium is preferably less than 0.19, more preferably less than 0.18, still more preferably 0.16 or less, still more preferably 0.13 or less, and particularly preferably 0.09 or less. The ratio of the number of moles of cobalt to the total number of moles of the metals other than lithium is preferably 0.03 or more, and more preferably 0.05 or more. The composite oxide may have a composition where the ratio of the number of moles of manganese to the total number of moles of the metals other than lithium is, for example, less than 0.2. The ratio of the number of moles of manganese to the total number of moles of the metals other than lithium is preferably less than 0.19, more preferably less than 0.18, still more preferably 0.16 or less, still more preferably 0.1 or less, and particularly preferably 0.05 or less. The ratio of the number of moles of manganese to the total number of moles of the metals other than lithium is also preferably 0.01 or more, and more preferably 0.03 or more. The composite oxide may have a composition where the mole ratio of lithium to the total number of moles of the metals other than lithium is, for example, from 1 to 1.15. The mole ratio of lithium to the total number of moles of the metals other than lithium is preferably 1.01 or more, and more preferably 1.03 or more. The mole ratio of lithium to the total number of moles of the metals other than lithium is also preferably 1.1 or less, and more preferably 1.06 or less.

The composite oxide may have a composition where the ratio of the number of moles of manganese to the sum of the number of moles of cobalt and the number of moles of manganese is, for example, less than 0.58 in consideration of electric discharge capacity. The ratio of the number of moles of manganese to the sum of the number of moles of cobalt and the number of moles of manganese is preferably 0.05 or more, and more preferably 0.1 or more. The ratio of the number of moles of manganese to the sum of the number of moles of cobalt and the number of moles of manganese is also preferably 0.5 or less, more preferably 0.4 or less, particularly preferably 0.3 or less, and most preferably 0.25 or less.

The mole ratio of nickel, cobalt, and manganese in the composite oxide may be, for example, nickel:cobalt:manganese=(from 0.8 to 0.98):(from 0.01 to 0.18):(from 0.01 to 0.18), and preferably (from 0.85 to 0.95):(from 0.03 to 0.15):(from 0.01 to 0.06).

The composite oxide may further contain a metal $M^1$ other than lithium, nickel, cobalt, and manganese. Examples of the metal $M^1$ include aluminium (Al), boron (B), sodium (Na), magnesium (Mg), silicon (Si), phosphorus (P), sulfur (S), potassium (K), calcium (Ca), titanium (Ti), vanadium (V), chromium (Cr), zinc (Zn), strontium (Sr), yttrium (Y), zirconium (Zr), niobium (Nb), molybdenum (Mo), indium (In), tin (Sn), barium (Ba), lanthanum (La), cerium (Ce), neodymium (Nd), samarium (Sm), europium (Eu), and gadolinium (Gd). The metal $M^1$ may be at least one selected from the group consisting of these metals.

When the composite oxide contains a metal $M^1$, the ratio of the number of moles of the metal $M^1$ to the total number of moles of the metals other than lithium may be, for example, 0.1 or less. The ratio of the number of moles of the metal $M^1$ to the total number of moles of the metals other than lithium is preferably 0.05 or less, and more preferably 0.04 or less, and also preferably 0.005 or more, and more preferably 0.01 or more.

The composite oxide may have a composition represented by, for example, formula (1) below:

$$Li_pNi_xCo_yMn_zM^1_wO_2 \qquad (1)$$

In formula (1), $1 \leq p \leq 1.15$, $0.8 < x < 1$, $0 < y < 0.2$, $0 < z < 0.2$, $0 \leq w \leq 0.1$, $x+y+z+w \leq 1$, and $0 < z/(y+z) < 0.58$; and $M^1$ is at least one selected from the group consisting of Al, B, Na, Mg, Si, P, S, K, Ca, Ti, V, Cr, Zn, Sr, Y, Zr, Nb, Mo, In, Sn, Ba, La, Ce, Nd, Sm, Eu, and Gd. Preferably, $1.01 \leq p \leq 1.1$, $0.82 \leq x \leq 0.92$, $0.03 \leq y \leq 0.18$, $0.01 \leq z \leq 0.18$, $0 \leq w \leq 0.1$, $x+y+z+w \leq 1$, and $0.05 \leq z/(y+z) \leq 0.5$, and more preferably $1.01 \leq p \leq 1.1$, $0.82 \leq x \leq 0.92$, $0.03 \leq y \leq 0.18$, $0.01 \leq z \leq 0.18$, $0.005 \leq w \leq 0.05$, $x+y+z+w \leq 1$, and $0.05 \leq z/(y+z) \leq 0.5$.

In consideration of initial efficiency of the non-aqueous electrolyte secondary battery, the composite oxide may have a disorder of elemental nickel of, for example, 3% or less. The disorder of elemental nickel may be obtained by X-ray diffractometry. The disorder of elemental nickel is preferably 2% or less, more preferably 1.8% or less, still more preferably 1.2% or less, particularly preferably 0.8% or less, and most preferably 0.4% or less. The lower limit of the disorder of elemental nickel may be set to, for example, 0.05% or more. As used herein, a disorder of elemental nickel is a chemical disorder of transition metal ions (nickel ions) not occupying its native sites. In the layer-structured composite oxide, a typical example is a replacement of lithium ions, which are expected to occupy Wyckoff 3b sites (3b sites, hereinafter the same), by transition metal ions, which are expected to occupy 3a sites. The smaller the disorder of elemental nickel, the greater the initial efficiency.

The disorder of elemental nickel in the composite oxide may be determined by the procedure below. The x-ray diffraction spectrum of the composite oxide is measured using a CuKα beam. Structure optimization is then carried out through Rietveld analysis based on the resulting x-ray diffraction spectrum using the composition model: $Li_{1-d}Ni_dMeO_2$ (where Me denotes a transition metal other than nickel in the composite oxide). The percentage of d calculated as the results of structure optimization is used as the value of disorder of elemental nickel.

The lithium-transition metal composite oxide forming the positive electrode active material may have a deposit containing boron on at least some regions of its surface. The boron-containing deposit may further contain, for example, oxygen and lithium in addition to boron. Specific examples of the boron-containing deposit include lithium metaborate ($LiBO_2$) and boric acid ($H_3BO_3$). The boron-containing deposit may be physically attached to the lithium-transition metal composite oxide, or at least a part of the deposit may chemically form a composite with the lithium-transition metal composite oxide. The amount of the boron-containing deposit on the positive electrode active material, in terms of the ratio of the number of moles of boron to the total number of moles of the metals other than lithium of the lithium-transition metal composite oxide, may be, for example, from 0.1 mol % to 3 mol %. The amount of the boron-containing deposit on the positive electrode active material, in terms of the ratio of the number of moles of boron to the total number of moles of the metals other than lithium of the lithium-transition metal composite oxide, is preferably 0.2 mol % or more, more preferably 0.3 mol % or more, and particularly preferably 0.5 mol % or more. The amount of the boron-containing deposit on the positive electrode active material, in terms of the ratio of the number of moles of boron to the total number of moles of the metals other than lithium of the lithium-transition metal composite oxide, is also preferably, 1.5 mol % or less, more preferably 1 mol % or less, and particularly preferably 0.6 mol % or less. The amount of the boron-containing deposit on the positive electrode active material may be measured using, for example, an inductively coupled plasma emission spectrometer.

Method of Producing Positive Electrode Active Material for Non-Aqueous Electrolyte Secondary Battery The method of producing a positive electrode active material for a non-aqueous electrolyte secondary battery may include a providing step of providing a composite containing nickel, cobalt, and manganese as metal components, wherein the ratio of the number of moles of nickel to a total number of moles of the metal components is greater than 0.8 and less than 1, the ratio of the number of moles of cobalt to the total number of moles of the metal components is less than 0.2, the ratio of the number of moles of manganese to the total number of moles of the metal components is less than 0.2, and the ratio of the number of moles of manganese to the sum of the number of moles of cobalt and the number of moles of manganese is less than 0.58; a mixing step of mixing the provided composite, a lithium compound, and an alkali metal compound containing an alkali metal other than lithium and having a melting point of 400° C. or less to obtain a lithium mixture; a synthesis step of heat treating the lithium mixture at a temperature of from 650° C. to 800° C. to obtain a heat-treated product; a dispersion step of dry-dispersion treating the heat-treated product to obtain a first dispersed product; and a washing step of contacting the first dispersed product with a liquid medium, and then removing at least part of the liquid medium. The lithium-transition metal composite oxide obtained after the washing step may have a ratio of a 50% particle diameter $D_{50}$ in a cumulative particle size distribution on a volumetric basis to an average particle diameter $D_{SEM}$ based on electron microscope observation, or $D_{50}/D_{SEM}$, of from 1 to 4.

The alkali metal compound containing an alkali metal other than lithium and having a melting point of 400° C. or less promotes sintering. This enables heat treatment at a relatively low temperature to produce single particle-type lithium-transition metal composite oxide particles where the ratio of the number of moles of nickel in the composition is the predetermined value or more, the ratio of the number of moles of manganese to the sum of cobalt and manganese is less than the predetermined value, and the ratio $D_{50}/D_{SEM}$ is within the predetermined range. Thus, in the lithium-transition metal composite oxide particles produced by the present method, generation, by heat reduction during the heat treatment, of impurity phase, which acts as a resistance component during charge and discharge, is reduced. Thus, a non-aqueous electrolyte secondary battery including the lithium-transition metal composite oxide particles may achieve superior initial efficiency and durability.

Providing Step

In the providing step, a composite having a desired composition is provided. The composite may contain metal components including at least nickel, cobalt, and manganese, and an oxygen atom. The composite may contain, for example, oxides, hydroxides, carbonates, and acetates of the metal components, and may contain at least oxides of the metal components.

The composite may have a composition where the ratio of the number of moles of nickel to the total number of moles of the metal components is, for example, greater than 0.8 and less than 1. The ratio of the number of moles of nickel to the total number of moles of the metal components is preferably 0.82 or more, more preferably 0.85 or more, and still more preferably 0.87 or more. The ratio of the number of moles of nickel to the total number of moles of the metal components is preferably 0.92 or less, and more preferably 0.90 or less. The composite may have a composition where the ratio of the number of moles of cobalt to the total number of moles of the metals other than lithium is, for example, less than 0.2. The ratio of the number of moles of cobalt to the total number of moles of the metals other than lithium is preferably less than 0.19, more preferably 0.16 or less, still more preferably 0.13 or less, and particularly preferably 0.09 or less. The ratio of the number of moles of cobalt to the total number of moles of the metals other than lithium is preferably 0.03 or more, and more preferably 0.05 or more. The composite may have a composition where the ratio of the number of moles of manganese to the total number of moles of the metals other than lithium is, for example, less than 0.2. The ratio of the number of moles of manganese to the total number of moles of the metals other than lithium is preferably less than 0.19, more preferably 0.16 or less, still more preferably 0.1 or less, and particularly preferably 0.05 or less. The ratio of the number of moles of manganese to the total number of moles of the metals other than lithium is preferably 0.01 or more, and more preferably 0.03 or more.

The composite may have a composition where the ratio of the number of moles of manganese to the sum of the number of moles of cobalt and the number of moles of manganese is, for example, less than 0.58 in consideration of electric discharge capacity. The ratio of the number of moles of manganese to the sum of the number of moles of cobalt and the number of moles of manganese is preferably 0.05 or more, and more preferably 0.1 or more. The ratio of the number of moles of manganese to the sum of the number of moles of cobalt and the number of moles of manganese is preferably 0.5 or less, more preferably 0.4 or less, still more preferably 0.3 or less, and particularly preferably 0.25 or less.

The mole ratio of nickel, cobalt, and manganese in the composite may be, for example, nickel:cobalt:manganese= (from 0.8 to 0.98):(from 0.01 to 0.18):(from 0.01 to 0.18), preferably (from 0.85 to 0.95):(from 0.03 to 0.15):(from 0.01 to 0.06).

The composite may further contain a metal $M^1$ other than lithium, nickel, cobalt, and manganese. Examples of the metal $M^1$ include aluminium (Al), boron (B), sodium (Na), magnesium (Mg), silicon (Si), phosphorus (P), sulfur (S), potassium (K), calcium (Ca), titanium (Ti), vanadium (V), chromium (Cr), zinc (Zn), strontium (Sr), yttrium (Y), zirconium (Zr), niobium (Nb), molybdenum (Mo), indium (In), tin (Sn), barium (Ba), lanthanum (La), cerium (Ce), neodymium (Nd), samarium (Sm), europium (Eu), and gadolinium (Gd). The metal $M^1$ may be at least one selected from the group consisting of these metals.

When the composite oxide contains a metal $M^1$, the ratio of the number of moles of the metal $M^1$ to the total number of moles of the metals other than lithium may be, for example, 0.1 or less. The ratio of the number of moles of the metal $M^1$ to the total number of moles of the metals other than lithium is preferably 0.05 or less, and more preferably 0.04 or less, and also preferably 0.005 or more, and more preferably 0.01 or more.

The composite may be provided by selecting a commercially available product as appropriate, or by preparing a composite having a desired composition in accordance with a common method. A composite having a desired composition may be obtained by, for example, a method of mixing raw material compounds (for example, a hydroxide and a carbonate compound) in a manner to meet a target composition, and then decomposing the mixture into a composite by heat treatment, or by a coprecipitation method of dissolving the raw material compounds in a solvent in which the raw material compounds are soluble, obtaining a precursor precipitate having a target composition through, for example, temperature adjustment, pH adjustment, and introduction of a complexing agent, and heat treating the precursor precipitate. An example of a method of producing a composite will now be described.

The coprecipitation method for obtaining a composite may include a seed generation step of adjusting, for example, the pH of a mixed solution containing metal ions in a desired component ratio to obtain a seed crystal, a crystallization step of growing the generated seed crystal to obtain a precursor precipitate with desired characteristics, and a step of obtaining a composite by heat treating the resulting precursor precipitate. For the details of the method of obtaining such a composite, refer to, for example, Japanese Patent Application Publications No. 2003-292322 and No. 2011-116580 (US Patent Application Publication No. 2012-270107).

In the seed generation step, the pH of a mixture solution containing nickel ions, cobalt ions, and manganese ions in a desired component ratio is adjusted to, for example, from 11 to 13 to prepare a liquid medium containing a seed crystal. The seed crystal may contain, for example, a composite hydroxide containing nickel, cobalt, and manganese in a desired ratio. The mixture solution may be prepared by dissolving a nickel salt, a cobalt salt, and a manganese salt at a desired ratio in water. The nickel salt, the cobalt salt, and the manganese salt may be in the form of, for example, a sulfate, a nitrate, and a hydrochloride. The mixture solution may contain another metal salt as appropriate (for example, a salt of a metal $M^1$) in addition to the nickel salt, the cobalt salt, and the manganese salt in a desired component ratio. The temperature in the seed generation step may be set to, for example, from 40° C. to 80° C. The atmosphere in the seed generation step may be set to a low oxidation atmosphere, and, for example, the atmosphere may maintain the oxygen concentration at 10% by volume or less.

In the crystallization step, the generated seed crystal is grown to obtain a precursor precipitate containing nickel, cobalt, and manganese and having desired characteristics. The precursor precipitate may contain, for example, a composite hydroxide containing nickel, cobalt, and manganese in a desired ratio. The seed crystal may be grown by, for example, adding a mixture solution containing nickel ions, cobalt ions, and manganese ions, and also other metal ions as appropriate while maintaining the pH of the liquid medium containing the seed crystal to, for example, from 7 to 12.5, and preferably from 7.5 to 12. The time to be taken for adding the mixture solution may be, for example, from 1 hour to 24 hours, and preferably from 3 hours to 18 hours. The temperature in the crystallization step may be, for example, from 40° C. to 80° C. The atmosphere in the crystallization step is the same as in the seed generation step. In the seed generation and crystallization steps, the pH may be adjusted using an acidic aqueous solution, such as an aqueous solution of sulfuric acid or nitric acid, or an alkaline aqueous solution, such as an aqueous solution of sodium hydroxide, or ammonia water.

In the step of obtaining a composite, the precursor precipitate obtained in the crystallization step is heat treated to obtain a composite. The heat treatment may be carried out by heating the precursor precipitate at a temperature of, for example, 500° C. or less, and preferably 350° C. or less. The temperature during the heat treatment may be, for example, 100° C. or more, and preferably 200° C. or more. The duration of the heat treatment may be, for example, from 0.5 hour to 48 hours, and preferably from 5 hours to 24 hours. The atmosphere of the heat treatment may be the atmospheric air or an oxygen-containing atmosphere. The heat treatment can be carried out using, for example, a box furnace, a rotary kiln furnace, a pusher furnace, or a roller hearth kiln furnace.

The composite may have an average particle diameter of, for example, from 2 μm to 30 μm. The average particle diameter of the composite is preferably from 3 μm to 25 μm. The average particle diameter of the composite is a volume average particle diameter, or a value at which the volume integrated value from the small particle size side in the volume-based particle size distribution obtained by the laser scattering method is 50%.

Mixing Step

In the mixing step, the composite, a lithium compound, and an alkali metal compound containing an alkali metal other than lithium and having a melting point of 400° C. or less are mixed to obtain a lithium mixture. Examples of the lithium compound include lithium hydroxide, lithium carbonate, and lithium oxide. The lithium compound to be mixed may be a solid or in a solution. The lithium compound in the form of a solid may have a particle diameter, in terms of a volume average particle diameter, of, for example, from 0.1 μm to 100 μm, and preferably from 2 μm to 20 μm. The lithium compound and the composite may be mixed to have a ratio of the number of moles of lithium contained in the lithium compound to the total number of moles of the metal elements contained in the composite of, for example, from 0.95 to 1.2, and preferably from 1 to 1.1.

Examples of the alkali metal other than lithium in the alkali metal compound include sodium, potassium, rubidium, and cesium, and the alkali metal may be at least one selected from the group consisting of these alkali metals, and may contain at least one of sodium and potassium. The alkali metal compound may be, for example, a hydroxide, an oxide, a carbonate, or an acetate, and may be at least one selected from the group consisting of these compounds. The alkali metal compound may have a melting point of, for example, 400° C. or less, or 365° C. or less, and 200° C. or more, or 280° C. or more. Specific examples of the alkali metal compound include potassium hydroxide (melting point of 360° C.), sodium hydroxide (melting point of 318° C.), and potassium acetate (melting point of 292° C.).

The alkali metal compound to be mixed may be a solid or in a solution. The alkali metal compound in the form of a solid may have a particle diameter, in terms of a volume average particle diameter, of, for example, from 0.1 μm to 100 μm, and preferably from 2 μm to 20 μm. The concentration of the alkali metal compound in the solution may be, for example, from 10% by mass to 60% by mass, and preferably from 40% by mass to 55% by mass. The alkali metal compound and the composite may be mixed to have a ratio of the number of moles of the alkali metal contained in the alkali metal compound to the total number of moles of the metal elements contained in the composite of, for example, from 0.03 to 0.15. The ratio is preferably from 0.055 to 0.1 in terms of the ratio of the number of moles of the alkali metal to the total number of moles of the metal elements in the composite.

In the mixing step, the composite, the lithium compound, and the alkali metal compound may be mixed at the same time, or the composite and the lithium compound may be mixed before the alkali metal compound is mixed thereto, or the composite and the alkali metal compound may be mixed before the lithium compound is mixed thereto. The mixing may be carried out using, for example, a high-speed shear mixer.

The lithium mixture may further contain other metals than nickel, cobalt, manganese, lithium, and an alkali metal (for example, a metal excluding any alkali metal from $M^1$). Preferred examples of such other metals include Al, Zr, Ti, Mg, Ta, Nb, Mo, and W, and at least one selected from the group consisting of these metals is more preferable. When the lithium mixture contains such other metals, the lithium mixture may be obtained by mixing such other metals in the form of single substances or metal compounds together with the composite, the lithium compound, and the alkali metal compound. Examples of the metal compound containing such other metals include oxides, hydroxides, chlorides, nitrides, carbonates, sulfates, nitrates, acetates, and borates.

When the lithium mixture contains such other metals, the ratio of the total number of moles of such other metals to the total number of moles of the metal components forming the composite may be, for example, from 0.005 to 0.1. The ratio of the total number of moles of such other metals to the total number of moles of the metal components forming the composite is preferably from 0.01 to 0.05.

Synthesis Step

In the synthesis step, the lithium mixture is heat-treated at a temperature of from 650° C. to 800° C. to obtain a heat-treated product. The heat-treated product may contain, for example, a lithium-transition metal composite oxide. The heat treatment may be carried out at a single temperature, or at multiple temperatures. When the heat treatment is carried out at multiple temperatures, for example, the temperature is raised to a first temperature, which is maintained for a predetermined time, and then the temperature is raised to a second temperature, which is maintained for a predetermined time. The first temperature may be, for example, from 200° C. to 600° C., and preferably from 400° C. to 500° C. The second temperature may be, for example, from 650° C. to 800° C., and preferably 700° C. to 780° C. The duration of the heat treatment may be, for example, from 0.5 hour to 48 hours. When the heat treatment is carried out at multiple temperatures, each heat treatment at each temperature may take from 0.2 hour to less than 48 hours.

The atmosphere of the heat treatment may be the atmospheric air or an oxygen-containing atmosphere. The heat treatment may be carried out using, for example, a box furnace, a rotary kiln furnace, a pusher furnace, or a roller hearth kiln furnace.

Dispersion Step

In the dispersion step, the heat-treated product is dry-dispersion-treated to obtain a first dispersed product. Unlike pulverization treatment, which involves, for example, a strong shearing force and an impact, dry-dispersion treatment of the heat-treated product enables to obtain a first dispersed product containing a lithium-transition metal composite oxide having, for example, a desired ratio of $D_{50}/D_{SEM}$ and a desired particle size distribution. In the method of producing a positive electrode active material, crushing treatment of the heat-treated product may be carried out before the dispersion treatment, or the dispersion treatment may be followed by classifying treatment. The dry-dispersion treatment may be carried out using, for example, a ball mill or a jet mill using, for example, air as a dispersion medium.

When, for example, the dispersion treatment is carried out using a ball mill, a resin medium may be used. As a material for the resin medium, for example, urethane resin or nylon resin may be used. Using a resin medium enables dissociation of sintered primary particles without pulverizing the particles. The resin medium may have a size of, for example, from Φ5 mm to 30 mm. For the shell, for example, urethane resin or nylon resin may be used. The duration of the dispersion treatment may be, for example, from 3 min to 60 min, and preferably from 10 min to 30 min. The dispersion treatment using a ball mill may be carried out by adjusting, for example, the amount of medium, the speed of rotation or vibration, the dispersion time, and the medium specific gravity in a manner to achieve a desired ratio of $D_{50}/D_{SEM}$ in accordance with the ratio $D_{90}/D_{10}$ of the composite to be used as a raw material.

When, for example, the dispersion treatment is carried out using a jet mill, for example, the supply pressure, the pulverization pressure, and the supply speed may be adjusted in accordance with the ratio $D_{90}/D_{10}$ of the composite to be used as a raw material to achieve a desired ratio of $D_{50}/D_{SEM}$ without pulverizing the primary particles. The supply pressure may be, for example, from 0.1 MPa to 0.5 MPa. The pulverization pressure may be, for example, from 0.1 MPa to 0.6 MPa.

Washing Step

In the washing step, the first dispersed product containing lithium-transition metal composite oxide particles is contacted with a liquid medium, and then the liquid medium is at least partially removed to obtain a second dispersed product. The second dispersed product may undergo, for example, liquid removal treatment and drying treatment as appropriate. The washing step may be a step of at least partially removing alkali components (for example, the lithium compound) of the reaction raw materials partially left unreacted in the first dispersed product.

The liquid medium to be used in the washing step may contain at least water, and may further contain, for example, other liquid components than water and a metal salt as appropriate. Examples of the other liquid components than water include water soluble organic solvents, such as alcohol. Examples of the metal salt include alkali metal salts, such as lithium and sodium. Containing a metal salt in the liquid medium enables alkaline components of the raw materials partially left unreacted to be more efficiently removed. The metal salt may be in the form of, for example, a sulfate or a hydroxide. When the liquid medium contains a metal salt, the ratio of the metal salt content in terms of mole concentration of metal ions may be, for example, from 0.01 mol/L to 2.0 mol/L. The ratio of the metal salt content of the liquid medium is preferably from 0.015 mol/L to 1.0 mol/L, more preferably from 0.015 mol/L to 0.2 mol/L, and still more preferably from 0.015 mol/L to 0.15 mol/L.

The temperature at which the first dispersed product and the liquid medium are contacted may be, for example, from 5° C. to 60° C., and preferably from 10° C. to 40° C. The duration of contact may be, for example, from 1 min to 2 hours, and preferably from 5 min to 30 min. The amount of the liquid medium to be contacted may be, for example, from 0.5 to 10 times the mass of the first dispersed product, and preferably from 1 to 4 times the mass of the first dispersed product.

The first dispersed product and the liquid medium may be contacted by introducing the first dispersed product into the liquid medium to prepare a slurry. When contacted in the form of a slurry, the solid concentration of the first dispersed product in the slurry may be, for example, from 10% by mass to 70% by mass, and preferably from 20% by mass to 50% by mass. When contacting the first dispersed product and the liquid medium, the mixture of the first dispersed product and the liquid medium may be stirred as appropriate. Stirring may be carried out by using, for example, a high-speed stirrer, a double corn mixer, or a kneader. Also, the first dispersed product and the liquid medium may be contacted by passing the liquid medium through the first dispersed product held in a funnel.

The second dispersed product obtained in the washing step may undergo drying treatment. The drying treatment only needs to remove the liquid medium attached to the second dispersed product at least partially, and may be carried out by, for example, heat drying, air drying, or drying under reduced pressure. The drying temperature for heat drying is high enough if the liquid medium contained in the second dispersed product is sufficiently removed at that temperature. The drying temperature may be, for example, from 80° C. to 300° C., and preferably from 150° C. to 280° C. Drying at a drying temperature within this range may sufficiently reduce elution of lithium into the attached liquid medium. This also reduces disintegration of the crystal structure of the particle surface, and sufficiently reduces decrease in charge and discharge capacity. The duration of drying may be appropriately selected in accordance with the amount of moisture contained in the second dispersed product. The duration of drying is, for example, from 1 hour to 12 hours. The amount of moisture contained in the second dispersed product after drying treatment may be, for example, 0.2% by mass or less, and preferably 0.1% by mass or less.

The lithium-transition metal composite oxide contained in the second dispersed product obtained in the above-described production method may have a ratio $D_{50}/D_{SEM}$ of from 1 to 4. The lithium-transition metal composite oxide has a composition containing lithium, nickel, cobalt, and manganese, wherein, relative to the total number of moles of the metals other than lithium, the ratio of the number of moles of nickel may be greater than 0.8 and less than 1, the ratio of the number of moles of cobalt may be less than 0.2, and the ratio of the number of moles of manganese may be less than 0.2; and the ratio of the number of moles of manganese to the sum of the number of moles of cobalt and the number of moles of manganese may be less than 0.58. The lithium-transition metal composite oxide may have a composition represented by, for example, formula (1) above.

The method of producing a positive electrode active material may further contain an attachment step of arranging a boron-containing deposit on the surface of the lithium-transition metal composite oxide obtained in the washing step as appropriate. A battery including the positive electrode active material containing the lithium-transition metal composite oxide that has a boron-containing deposit on the surface can have a further improved discharge capacity. The attachment step may include, for example, a boron mixing step of mixing the lithium-transition metal composite oxide and a boron source compound as a raw material for the boron-containing deposit to obtain a boron mixture, and a boron heat treatment step of heat treating the boron mixture.

In the boron mixing step, the lithium-transition metal composite oxide and a boron source compound may be mixed to obtain a boron mixture. The mixing of the lithium-transition metal composite oxide and a boron source compound may be dry or wet mixing. The mixing can be carried out by using, for example, a super mixer.

The boron source compound may be at least one selected from the group consisting of boron oxides, oxoacids of boron, and oxoacid salts of boron. More specific examples of the boron source compound include lithium tetraborate ($Li_2B_4O_7$), ammonium pentaborate ($NH_4B_5O_8$), orthoboric acid ($H_3BO_3$, which is a typical boric acid), lithium metaborate ($LiBO_2$), and boron oxide ($B_2O_3$). The boron source compound may be at least one selected from the group consisting of these compounds, and may be orthoboric acid from the aspect of cost.

The boron source compound may be mixed in the form of a solid or a solution thereof with the lithium-transition metal composite oxide. When used in the form of a solid, the boron source compound may have a volume average particle diameter of, for example, from 1 μm to 60 μm, and preferably from 10 μm to 30 μm.

The amount of the boron source compound in the boron mixture in terms of the ratio of the number of moles of boron element to the total number of moles of the metals other than lithium in the lithium-transition metal composite oxide may be from 0.1 mol % to 3 mol %, preferably 0.2 mol % or more, more preferably 0.3 mol % or more, and particularly preferably 0.5 mol % or more, and also preferably 1.5 mol % or less, more preferably 1 mol % or less, and particularly preferably 0.6 mol % or less.

The boron mixture may further contain a lithium compound as appropriate. Examples of the lithium compound include lithium hydroxide, lithium oxide, lithium carbonate, and lithium nitrate. The lithium compound may be at least one selected from the group consisting of these compounds.

The lithium compound may be mixed in the form of a solid or a solution thereof with the lithium-transition metal composite oxide and a boron source compound. When used in the form of a solid, the lithium compound may have a volume average particle diameter of, for example, from 1 μm to 60 μm, and preferably from 10 μm to 30 μm.

The amount of the lithium compound in the boron mixture in terms of the ratio of the number of moles of lithium to the total number of moles of the metals other than lithium in the lithium-transition metal composite oxide may be, for example, from 0.05 mol % to 1 mol %, preferably from 0.05 mol % to 0.5 mol %, and more preferably from 0.1 mol % to 0.3 mol %.

In the boron heat treatment step, the boron mixture is heat-treated to obtain a positive electrode active material containing the lithium-transition metal composite oxide having a boron-containing deposit on its surface. The heat treatment temperature may be, for example, from 100° C. to 450° C., preferably from 150° C. to 400° C., more preferably from 200° C. to 400° C., more preferably from 220° C. to 350° C., and still more preferably from 250° C. to 350° C. The heat treatment atmosphere may be an oxygen-containing atmosphere, and may be the atmospheric air. The duration of the heat treatment may be, for example, from 1 hour to 20 hours, and preferably from 5 hours to 15 hours. The heat-treated product obtained in the boron heat treatment step may undergo, for example, crushing treatment and classifying treatment as appropriate.

Electrode for Non-Aqueous Electrolyte Secondary Battery

The electrode for a non-aqueous electrolyte secondary battery includes a current collector, and a positive electrode active material layer containing a positive electrode active material for a non-aqueous electrolyte secondary battery produced by the production method described above and arranged on the current collector. A non-aqueous electrolyte secondary battery including such an electrode may achieve high initial efficiency and high durability.

Examples of the material for the current collector include aluminium, nickel, and stainless. The positive electrode active material layer may be formed by mixing the positive electrode active material, a conductive material, a binder, and so forth with a solvent, and applying the resulting positive electrode mixture on the current collector, followed by, for example, drying treatment and pressurizing treatment. Examples of the conductive material include natural graphite, artificial graphite, and acetylene black. Examples of the binder include polyvinylidene fluoride, polytetrafluoroethylene, and polyamide acrylic resin.

Non-Aqueous Electrolyte Secondary Battery

The non-aqueous electrolyte secondary battery includes the above-described electrode for a non-aqueous electrolyte secondary battery. The non-aqueous electrolyte secondary battery includes, in addition to the electrode for a non-aqueous electrolyte secondary battery, a negative electrode for a non-aqueous electrolyte secondary battery, a non-aqueous electrolyte, and a separator. For the negative electrode, the non-aqueous electrolyte, the separator, and so forth to be included in the non-aqueous electrolyte secondary battery, those for a non-aqueous electrolyte secondary battery described, for example, in Japanese Patent Application Publications No. 2002-075367, No. 2011-146390, and No. 2006-12433 (these publications are incorporated herein by reference in their entireties) may be used as appropriate.

EXAMPLES

The present invention will now be described specifically by means of Examples; however, the present invention is not limited to these Examples.

Example 1

Seed Generation Step

To a reaction vessel, 10 kg of water was added, and while stirring, the content was adjusted to have an ammonium ion concentration of 1.8% by mass by adding ammonia solution. The temperature within the vessel was set to 25° C., and the vessel was purged with nitrogen gas to maintain an oxygen concentration in the vessel at 10% or less. To the water in the reaction vessel, a 25% by mass aqueous solution of sodium hydroxide was added to adjust the pH of the solution within the vessel to 13.5 or more. A nickel sulfate solution, a cobalt sulfate solution, and a manganese sulfate solution were mixed to have a mole ratio of 88:9:3 to prepare a mixture solution (1.7 mol/L). Into the vessel, the mixture solution was added until the mole fraction of the solute reaches 4, and seed generation was carried out while controlling the pH of the reaction solution to 12.0 or more using a sodium hydroxide solution.

Crystallization Step

After the seed generation step, the temperature in the vessel was maintained to 25° C. or more until the crystallization step completes. A mixture solution containing the solute in an amount of 1200 mol was prepared, which was added into the vessel together with an aqueous solution of ammonia over 5 hours or more while maintaining the ammonium ion concentration of the solution to 2000 ppm or more so as not to cause a new seed generation in the reaction vessel. During the reaction, the pH of the reaction solution was regulated to from 10.5 to 12.0 using a sodium hydroxide solution. During the reaction, point-by-point sampling was conducted, and the addition of the mixture solution and an aqueous solution of ammonia was terminated when the composite hydroxide particles had a $D_{50}$ of about 4.4 μm. The product was then washed with water, filtered, and dried to obtain composite hydroxide particles as a precursor precipitate.

The resultant composite hydroxide particles were heat-treated at 300° C. for 20 hours in the atmospheric atmosphere to obtain a transition metal oxide as a composite having a composition in mole ratio of Ni/Co/Mn=0.88/0.09/0.03, and $D_{10}$=3.4 μm, $D_{50}$=4.3 μm, $D_{90}$=5.5 μm, and $D_{90}/D_{10}$=1.6.

Synthesis Step

The resultant composite and an aqueous solution of potassium hydroxide (concentration: 50%) were mixed to have a mole ratio of K/(Ni+Co+Mn)=0.05. Subsequently, lithium hydroxide monohydrate was added and mixed to have a mole ratio of Li/(Ni+Co+Mn)=1.08, and also aluminum hydroxide was added and mixed to have a mole ratio of Al/(Ni+Co+Mn)=0.01 to obtain a lithium mixture. The resultant lithium mixture was heat-treated at 450° C. for 3 hours in the atmospheric air, and continuously heat-treated at 750° C. for 8 hours to obtain a heat-treated product. The resultant heat-treated product was crushed and dispersion-treated for 15 min using a resin ball mill to obtain a powdery product.

The resultant powdery product was added to pure water to obtain a slurry with a solid concentration of 30% by mass. The solid concentration was calculated by: the mass of the powdery product/(the mass of the powdery product+the mass of the washing liquid). The slurry was stirred for 30 min, dewatered through a funnel, and separated in the form of a cake. The separated cake was dried at 250° C. for 10 hours to obtain a dried product. The resultant dried product was crushed and dry-sieved to obtain a positive electrode active material containing a lithium-transition metal composite oxide. A scanning electron microscope (SEM) image of the resultant positive electrode active material was captured using a SEM (acceleration voltage of 20 kV). The SEM image of the resultant positive electrode active material is shown in FIG. 1, and the physical property values are shown in Table 1.

Example 2

A lithium transition metal oxide was obtained in the same manner as in Example 1 except that the nickel sulfate solution, the cobalt sulfate solution, and the manganese sulfate solution were mixed to have a mole ratio of 90:9:1 to prepare a mixture solution in the seed generation step.

Attachment Step

Figure 2:
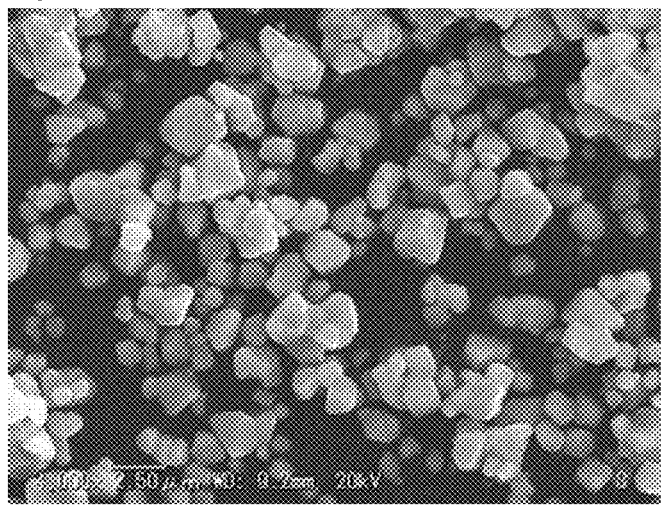
FIG. 2 is an example of a SEM image of a positive electrode active material according to Example 2.

The resultant lithium transition metal oxide, orthoboric acid, and a lithium hydroxide monohydrate, wherein the orthoboric acid was 0.3 mol % in terms of boron element, and the lithium hydroxide monohydrate was 0.15 mol % in terms of lithium element relative to the total number of moles of the metals other than lithium in the lithium-transition metal composite oxide, were mixed and stirred to obtain a mixture containing boron and lithium. The resultant mixture was heat-treated at 300° C. for 10 hours in the atmospheric air to obtain a positive electrode active material containing a lithium-transition metal composite oxide having a boron-containing deposit on its surface. The SEM image of the resultant positive electrode active material is shown in FIG. 2, and the physical property values are shown in Table 1.

Example 3

Figure 3:
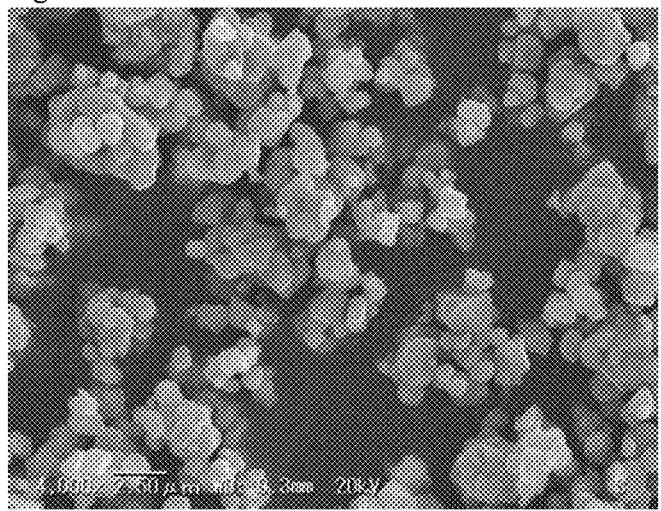
FIG. 3 is an example of a SEM image of a positive electrode active material according to Example 3.

A positive electrode active material containing a lithium transition metal oxide having a boron-containing deposit on its surface was obtained in the same manner as in Example 2 except that the nickel sulfate solution, the cobalt sulfate solution, and the manganese sulfate solution were mixed to have a mole ratio of 88:9:3 to prepare a mixture solution in the seed generation step. The SEM image of the resultant positive electrode active material is shown in FIG. 3, and the physical property values are shown in Table 1.

Example 4

Figure 4:
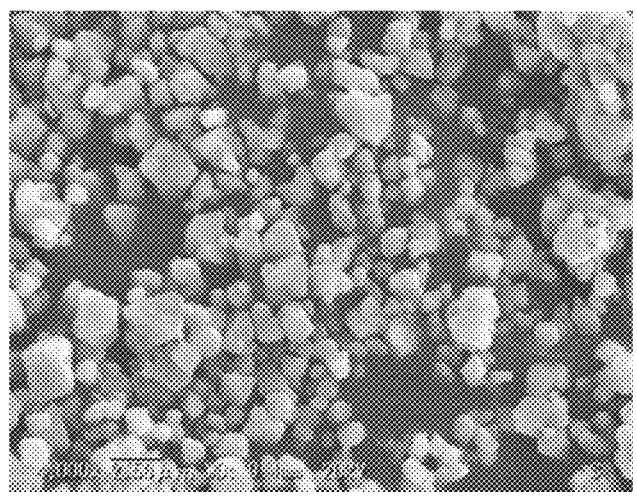
FIG. 4 is an example of a SEM image of a positive electrode active material according to Example 4.

A positive electrode active material containing a lithium transition metal oxide having a boron-containing deposit on its surface was obtained in the same manner as in Example 3 except that instead of an aqueous solution of potassium hydroxide, an aqueous solution of sodium hydroxide (concentration: 50%) was used and mixed to have a mole ratio of Na/(Ni+Co+Mn)=0.08 in the synthesis step. The SEM image of the resultant positive electrode active material is shown in FIG. 4, and the physical property values are shown in Table 1.

Example 5

Figure 5:
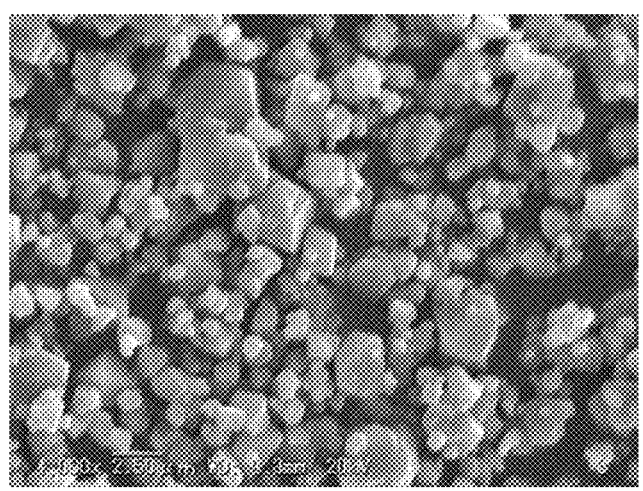
FIG. 5 is an example of a SEM image of a positive electrode active material according to Example 5.

A positive electrode active material containing a lithium transition metal oxide having a boron-containing deposit on its surface was obtained in the same manner as in Example 4 except that the nickel sulfate solution, the cobalt sulfate solution, and the manganese sulfate solution were mixed to have a mole ratio of 92:5:3 to prepare a mixture solution in the seed generation step, and that aluminum hydroxide was added to have a mole ratio of Al/(Ni+Co+Mn)=0.02 in the synthesis step. The SEM image of the resultant positive electrode active material is shown in FIG. 5, and the physical property values are shown in Table 1.

Comparative Example 1

Figure 6:
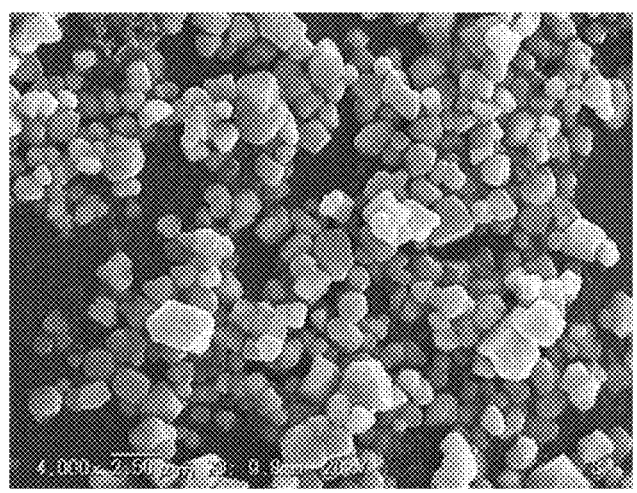
FIG. 6 is an example of a SEM image of a positive electrode active material according to Comparative Example 1.

A positive electrode active material containing a lithium transition metal oxide was obtained in the same manner as in Example 1 except that the nickel sulfate solution and the cobalt sulfate solution were mixed, without using the manganese sulfate solution, to have a mole ratio of 95:5 to prepare a mixture solution in the seed generation step, that aluminum hydroxide was added to have a mole ratio of Al/(Ni+Co+Mn)=0.02 in the synthesis step, and that the heat treatment temperature was changed from 750° C. to 725° C. in the synthesis step. The SEM image of the resultant positive electrode active material is shown in FIG. 6, and the physical property values are shown in Table 1.

Comparative Example 2

Figure 7:
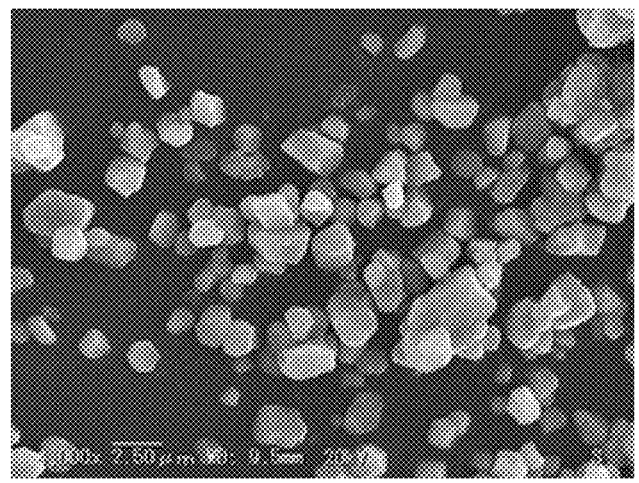
FIG. 7 is an example of a SEM image of a positive electrode active material according to Comparative Example 2.

The lithium transition metal oxide obtained in Comparative Example 1 was subjected to the attachment step as in Example 2 to obtain a positive electrode active material containing a lithium transition metal oxide having a boron-containing deposit on its surface. The SEM image of the resultant positive electrode active material is shown in FIG. 7, and the physical property values are shown in Table 1.

Comparative Example 3

Figure 8:
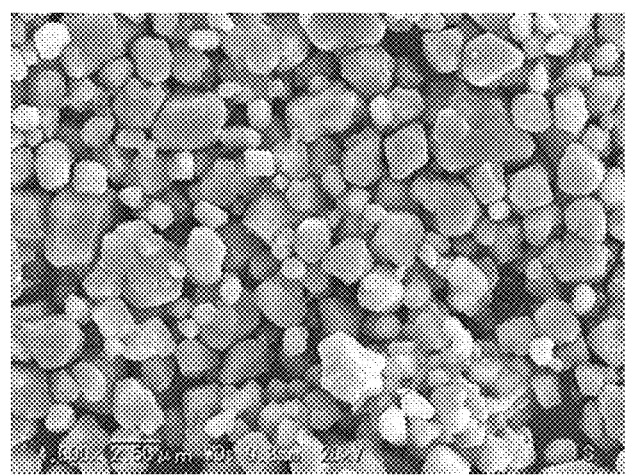
FIG. 8 is an example of a SEM image of a positive electrode active material according to Comparative Example 3.

A positive electrode active material containing a lithium transition metal oxide was obtained in the same manner as in Example 4 except that the nickel sulfate solution, the cobalt sulfate solution, and the manganese sulfate solution were mixed to have a mole ratio of 88:5:7 to prepare a mixture solution in the seed generation step, that aluminum hydroxide was added to have a mole ratio of Al/(Ni+Co+Mn)=0.01 in the synthesis step, and that the heat treatment temperature was changed from 750° C. to 810° C. in the synthesis step. The SEM image of the resultant positive electrode active material is shown in FIG. 8, and the physical property values are shown in Table 1.

Comparative Example 4

Figure 9:
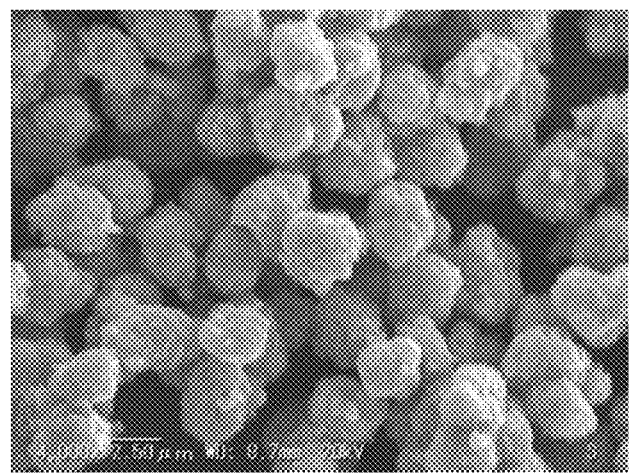
FIG. 9 is an example of a SEM image of a positive electrode active material according to Comparative Example 4.

A positive electrode active material containing a lithium transition metal oxide having a boron-containing deposit on its surface was obtained in the same manner as in Example 3 except that no aqueous solution of potassium hydroxide (concentration: 50%) was used in the synthesis step. The SEM image of the resultant positive electrode active material is shown in FIG. 9, and the physical property values are shown in Table 1.

Comparative Example 5

Figure 10:
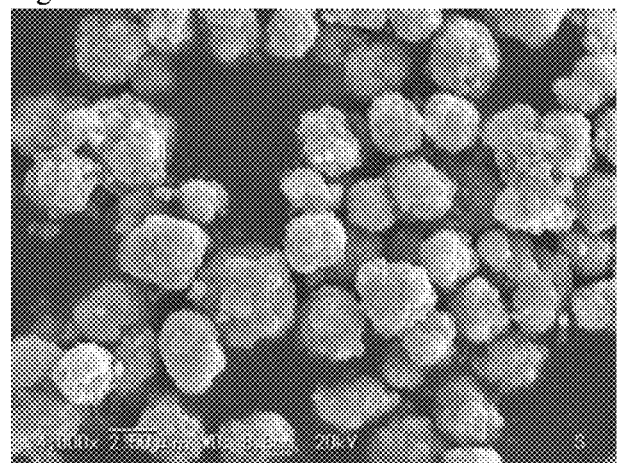
FIG. 10 is an example of a SEM image of a positive electrode active material according to Comparative Example 5.

A positive electrode active material containing a lithium transition metal oxide having a boron-containing deposit on its surface was obtained in the same manner as in Comparative Example 2 except that no aqueous solution of potassium hydroxide (concentration: 50%) was used in the synthesis step, and that the heat treatment temperature was changed from 725° C. to 710° C. in the synthesis step. The SEM image of the resultant positive electrode active material is shown in FIG. 10, and the physical property values are shown in Table 1.

Comparative Example 6

Figure 11:
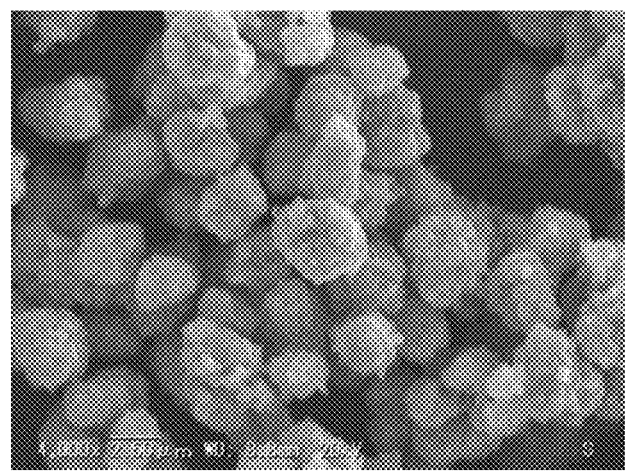
FIG. 11 is an example of a SEM image of a positive electrode active material according to Comparative Example 6.

A positive electrode active material containing a lithium transition metal oxide was obtained in the same manner as in Example 1 except that no aqueous solution of potassium hydroxide (concentration: 50%) was used in the synthesis step. The SEM image of the resultant positive electrode active material is shown in FIG. 11, and the physical property values are shown in Table 1.

Particle Diameter Evaluation

For each of the positive electrode active material obtained above, physical properties were measured in the manner described below. For $D_{50}$, cumulative particle size distribution on a volumetric basis was measured using a laser diffraction particle size distribution analyzer (SALD-3100 by Shimadzu), and a particle diameter corresponding to cumulative 50% from the small diameter side was obtained as $D_{50}$. For average particle diameter $D_{SEM}$ based on electron microscope observation, 100 particles whose outlines were discernible were selected in an image captured using a scanning electron microscope (SEM) at a magnification of from 1000 to 10000 times, spherical equivalent diameters of the selected particles were calculated using an image treatment software (ImageJ), and an arithmetic mean value of the resulting spherical equivalent diameters was obtained as $D_{SEM}$.

Disorder of Elemental Nickel (Ni Disorder)

For each of the positive electrode active materials obtained above, an x-ray diffraction spectrum (tube current: 200 mA, tube voltage: 45 kV) was measured using a CuKα beam. Based on the resultant x-ray diffraction spectrum, structure optimization of the corresponding lithium-transition metal composite oxide was carried out using the composition model: $(Li_{1-d}Ni_d)(Ni_xCo_yMn_zAl_w)O_2 (x+y+z+w=1)$ through Rietveld analysis using Rietan 2000 software. The percentage of d calculated through the structure optimization was determined as each Ni disorder.

and the negative electrode, all of which was placed in a laminated pouch. This was then vacuum-dried at 65° C. to remove moisture adsorbed on the members. Thereafter, an electrolyte was injected into the laminated pouch in an argon atmosphere, and the pouch was sealed to produce a battery for evaluation. As the electrolyte, a mixture of ethylene carbonate (EC) and methyl ethyl carbonate (MEC) at a volume ratio of 3:7 in which lithium hexafluorophosphate ($LiPF_6$) was dissolved to have a concentration of 1 mol/L was used. The thus obtained each battery for evaluation was placed into a bath at 25° C., aged with a weak current, and then subjected to evaluation described below. The results are shown in Table 2.

TABLE 1

| | Composition | | | | | | Physical property values | | | | Ni |
| --- | --- | --- | --- | --- | --- | --- | --- | --- | --- | --- | --- |
| | p | x | y | z | w | Mn/(Co + Mn) | Deposit | $D_{50}$ μm | $D_{SEM}$ μm | $D_{50}/D_{SEM}$ | $D_{90}/D_{10}$ | disorder % |
| Example 1 | 1.04 | 0.87 | 0.09 | 0.03 | 0.01 | 0.25 | No | 3.5 | 1.3 | 2.7 | 3.7 | 0.7 |
| Example 2 | 1.04 | 0.89 | 0.09 | 0.01 | 0.01 | 0.10 | Yes | 5.0 | 1.5 | 3.2 | 3.9 | 0.2 |
| Example 3 | 1.04 | 0.87 | 0.09 | 0.03 | 0.01 | 0.25 | Yes | 5.0 | 1.3 | 3.9 | 3.1 | 0.3 |
| Example 4 | 1.05 | 0.87 | 0.09 | 0.03 | 0.01 | 0.25 | Yes | 4.7 | 1.4 | 3.4 | 3.8 | 0.2 |
| Example 5 | 1.02 | 0.90 | 0.05 | 0.03 | 0.02 | 0.38 | Yes | 5.2 | 1.5 | 3.5 | 3.6 | 1.0 |
| Comparative Example 1 | 1.02 | 0.93 | 0.05 | 0 | 0.02 | 0 | No | 3.2 | 1.5 | 2.1 | 3.1 | 1.2 |
| Comparative Example 2 | 1.02 | 0.93 | 0.05 | 0 | 0.02 | 0 | Yes | 4.5 | 1.5 | 3.0 | 3.3 | 0.7 |
| Comparative Example 3 | 1.04 | 0.87 | 0.05 | 0.07 | 0.01 | 0.58 | Yes | 4.9 | 1.6 | 3.1 | 3.9 | 1.9 |
| Comparative Example 4 | 1.06 | 0.87 | 0.09 | 0.03 | 0.01 | 0.25 | Yes | 5.2 | 0.5 | 10.3 | 3.7 | 0.6 |
| Comparative Example 5 | 1.05 | 0.93 | 0.05 | 0 | 0.02 | 0 | Yes | 5.1 | 0.5 | 10.2 | 2.9 | 0.5 |
| Comparative Example 6 | 1.05 | 0.87 | 0.09 | 0.03 | 0.01 | 0.25 | No | 5.0 | 0.5 | 10.0 | 3.5 | 1.0 |

Fabrication of Battery for Evaluation

Batteries for evaluation were prepared in the procedure below using the respective positive electrode active materials obtained above.

Preparation of Positive Electrode

The positive electrode active material in an amount of 92 parts by mass, acetylene black in an amount of 3 parts by mass, and polyvinylidene fluoride (PVDF) in an amount of 5 parts by mass were dispersed in N-methyl-2-pyrolidone (NMP) to prepare a positive electrode mixture. The resultant positive electrode mixture was applied on an aluminium foil current collector, dried, compression-molded with a roller press, and cut into a predetermined size to prepare a positive electrode.

Fabrication of Negative Electrode

An artificial graphite in an amount of 97.5 parts by weight, carboxymethyl cellulose (CMC) in an amount of 1.5 parts by mass, and styrene-butadiene rubber (SBR) in an amount of 1.0 part by mass were dispersed and dissolved in pure water to prepare a negative electrode slurry. The resultant negative electrode slurry was applied on a copper foil current collector, dried, compression-molded with a roller press, and cut into a predetermined size to prepare a negative electrode.

Fabrication of Battery for Evaluation

Lead electrodes were each connected to the current collectors of the positive electrode and the negative electrode, and a separator was placed between the positive electrode Measurement of Initial Efficiency Each battery for evaluation was subjected to constant-voltage/constant-current charging at a charge voltage of 4.25 V and a charge current of 0.1 C, and the charge capacity was measured. After the measurement, each battery was subjected to constant current discharging at a discharge voltage of 2.5 V (counter electrode: Li) and a discharge current of 0.1 C, and the discharge capacity was measured.

Measurement of Capacity Maintenance Rate

Each battery for evaluation was aged by being once subjected to constant-voltage/constant-current charging at a charge voltage of 4.25 V (counter electrode: Li) and a charge current of 0.2 C (1 C ≡ a current at which discharge is completed in one hour), and constant current discharging at a discharge voltage of 2.75 V (counter electrode: Li) and a discharge current of 0.2 C.

After aging, each battery was subjected to multi-cycles of charge and discharge where one cycle consists of constant-voltage/constant-current charging at a charge voltage of 4.25 V (counter electrode: Li) and a charge current of 0.3 C, and constant current discharging at a discharge voltage of 2.75 V (counter electrode: Li) and a discharge current of 0.3 C. The discharge capacity after each cycle was measured at a constant temperature of 45° C. The capacity maintenance rate after n cycles Rs(n), which was determined as a ratio ≡ Ed(n)/Ed(1) (where Ed(n) is a discharge capacity after n cycles, and Ed(1) is a discharge capacity after one cycle) was calculated with the number of cycles n=30.

TABLE 2

| | Battery characteristics | | | |
|---|---|---|---|---|
| | Charge capacity mAh/g | Discharge capacity mAh/g | Initial efficiency % | Capacity maintenance rate % |
| Example 1 | 223 | 197 | 88 | 97 |
| Example 2 | 236 | 214 | 91 | 97 |
| Example 3 | 234 | 213 | 91 | 97 |
| Example 4 | 232 | 213 | 92 | 98 |
| Example 5 | 238 | 210 | 88 | 97 |
| Comparative Example 1 | 246 | 204 | 83 | 91 |
| Comparative Example 2 | 247 | 206 | 83 | 92 |
| Comparative Example 3 | 227 | 203 | 89 | 94 |
| Comparative Example 4 | 232 | 218 | 94 | 88 |
| Comparative Example 5 | 251 | 223 | 89 | 83 |
| Comparative Example 6 | 228 | 214 | 94 | 87 |

Table 2 reveals that batteries containing a positive electrode active material like those of Examples 1 to 5, which have a ratio $D_{50}/D_{SEM}$ of from 1 to 4 and a ratio of the number of moles of manganese to the sum of the number of moles of cobalt and the number of moles of manganese of less than 0.58, have a higher initial efficiency and capacity maintenance rate (durability) than the batteries of Comparative Examples 1 to 3. It was also revealed that the batteries of Examples 2 to 5, which have a boron-containing deposit on the surface of the lithium-transition metal composite oxide, have a higher discharge capacity than the battery of Example 1.

Comparative Example 4 (aggregated particles), which contains manganese, has a lower discharge capacity than Comparative Example 5 (aggregated particles). However, Example 3 (single particles), which contains manganese, has a higher discharge capacity than Comparative Example 2 (single particles). This reveals that the effect of containing manganese in the composition is specific to single particle-type lithium transition metal oxide with a ratio $D_{50}/D_{SEM}$ of from 1 to 4.

TABLE 3

| | Deposit | Discharge capacity mAh/g | Difference from the reference in discharge capacity |
|---|---|---|---|
| Example 1 | No | 197 | Reference |
| Example 3 | Yes | 213 | +16 |

TABLE 4

| | Deposit | Discharge capacity mAh/g | Difference from the reference in discharge capacity |
|---|---|---|---|
| Comparative Example 1 | No | 204 | Reference |
| Comparative Example 2 | Yes | 206 | +2 |

TABLE 5

| | Deposit | Discharge capacity mAh/g | Difference from the reference in discharge capacity |
|---|---|---|---|
| Comparative Example 4 | No | 218 | Reference |
| Comparative Example 6 | Yes | 214 | −4 |

Tables 3 to 5 show a range of improvement in discharge capacity of the lithium-transition metal composite oxides having a boron-containing deposit from their respective reference lithium-transition metal composite oxides having no boron-containing deposit. The effect of the boron-containing deposit of Example 3 in Table 3 was the greatest compared with the effect of the boron-containing deposit in aggregated particles of Table 5 and the effect of the boron-containing deposit in single-type particles with no manganese in its composition of Table 4.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A positive electrode active material for a non-aqueous electrolyte secondary battery, the positive electrode active material comprising:
   a lithium-transition metal composite oxide containing lithium, nickel, cobalt, and manganese, and having a layered structure,
   wherein the lithium-transition metal composite oxide has a ratio $D_{50}/D_{SEM}$ that is from 1 to 4, wherein $D_{50}$ is a 50% particle diameter in a cumulative particle size distribution on a volumetric basis and $D_{SEM}$ is an average particle diameter based on electron microscope observation,
   a disorder of elemental nickel that is 3% or less, and
   the lithium-transition metal composite oxide has a composition with
   a ratio of a number of moles of cobalt to the total number of moles of the metals other than lithium that is less than 0.2,
   a ratio of a number of moles of manganese to the total number of moles of the metals other than lithium that is less than 0.2, and
   a ratio of the number of moles of manganese to a sum of the number of moles of cobalt and the number of moles of manganese that is less than 0.4.

2. The positive electrode active material for a non-aqueous electrolyte secondary battery according to claim 1, wherein the lithium-transition metal composite oxide has a deposit containing boron on a surface thereof.

3. The positive electrode active material for a non-aqueous electrolyte secondary battery according to claim 2, wherein the lithium-transition metal composite oxide has a deposit content in terms of boron content relative to the total number of moles of the metals other than lithium of from 0.1 mol % to 3 mol %.

4. The positive electrode active material for a non-aqueous electrolyte secondary battery according to claim 3, wherein the deposit further contains lithium.

5. The positive electrode active material for a non-aqueous electrolyte secondary battery according to claim 4, wherein the average particle diameter $D_{SEM}$ of the lithium-transition metal composite oxide is from 1 μm to 7 μm.

6. The positive electrode active material for a non-aqueous electrolyte secondary battery according to claim 1, wherein the average particle diameter $D_{SEM}$ of the lithium-transition metal composite oxide is from 1 μm to 7 μm.

7. The positive electrode active material for a non-aqueous electrolyte secondary battery according to claim 6, wherein the lithium-transition metal composite oxide has a ratio $D_{90}/D_{10}$ of a 90% particle diameter $D_{90}$ to a 10% particle diameter $D_{10}$ in a cumulative particle size distribution on a volumetric basis that is 4.5 or less.

8. The positive electrode active material for a non-aqueous electrolyte secondary battery according to claim 1, wherein the lithium-transition metal composite oxide has a ratio $D_{90}/D_{10}$ of a 90% particle diameter $D_{90}$ to a 10% particle diameter $D_{10}$ in a cumulative particle size distribution on a volumetric basis of 4.5 or less.

9. The positive electrode active material for a non-aqueous electrolyte secondary battery according to claim 8, wherein the lithium-transition metal composite oxide has a composition with a ratio of a number of moles of nickel to a total number of moles of metals other than lithium that is greater than 0.8 and less than 1.

10. The positive electrode active material for a non-aqueous electrolyte secondary battery according to claim 9, wherein the lithium-transition metal composite oxide has the composition with the ratio of the number of moles of manganese to the sum of the number of moles of cobalt and the number of moles of manganese that is from 0.1.

11. The positive electrode active material for a non-aqueous electrolyte secondary battery according to claim 10, wherein the lithium-transition metal composite oxide has the composition represented by a formula below:

$$Li_pNi_xCo_yMn_zM^1_wO_2$$

wherein 1≤p≤1.15, 0.8<x<1, 0<y<0.2, 0<z<0.2, 0≤w≤0.1, x+y+z+w≤1, and 0.1<z/(y+z)<0.4; and $M^1$ is at least one selected from the group consisting of Al, B, Na, Mg, Si, P, S, K, Ca, Ti, V, Cr, Zn, Sr, Y, Zr, Nb, Mo, In, Sn, Ba, La, Ce, Nd, Sm, Eu, and Gd.

12. The positive electrode active material for a non-aqueous electrolyte secondary battery according to claim 1, wherein the lithium-transition metal composite oxide has the composition with the ratio of the number of moles of manganese to the sum of the number of moles of cobalt and the number of moles of manganese that is from 0.1.

13. The positive electrode active material for a non-aqueous electrolyte secondary battery according to claim 1, wherein the lithium-transition metal composite oxide has the composition represented by a formula below:

$$Li_pNi_xCo_yMn_zM^1_wO_2$$

wherein 1≤p≤1.15, 0.8<x<1, 0<y<0.2, 0<z<0.2, 0≤w≤0.1, x+y+z+w≤1, and 0<z/(y+z)<0.4; and $M^1$ is at least one selected from the group consisting of Al, B, Na, Mg, Si, P, S, K, Ca, Ti, V, Cr, Zn, Sr, Y, Zr, Nb, Mo, In, Sn, Ba, La, Ce, Nd, Sm, Eu, and Gd.

14. A method of producing a positive electrode active material for a non-aqueous electrolyte secondary battery, the method comprising:
   preparing a composite containing nickel, cobalt, and manganese as metal components,
   wherein
   a ratio of a number of moles of cobalt to the total number of moles of the metal components is less than 0.2,
   a ratio of a number of moles of manganese to the total number of moles of the metal components is less than 0.2, and
   a ratio of the number of moles of manganese to a sum of the number of moles of cobalt and the number of moles of manganese is less than 0.4;
   mixing the composite, a lithium compound, and an alkali metal compound containing an alkali metal other than lithium and having a melting point of 400° C. or less to obtain a lithium mixture;

heat treating the lithium mixture at a temperature of from 650° C. to 800° C. to obtain a heat-treated product;

dry-dispersion treating the heat-treated product to obtain a first dispersed product; and contacting the first dispersed product with a liquid medium, and then removing at least part of the liquid medium to obtain a lithium-transition metal composite oxide, wherein the lithium-transition metal composite oxide has a ratio $D_{50}/D_{SEM}$ that is from 1 to 4, wherein $D_{50}$ is a 50% particle diameter in a cumulative particle size distribution on a volumetric basis and $D_{SEM}$ is an average particle diameter based on electron microscope observation and a disorder of elemental nickel that is 3% or less.

15. The method according to claim 14, wherein the lithium mixture has a ratio of a number of moles of the alkali metal other than lithium contained in the alkali metal compound to the total number of moles of metal components contained in the composite that is from 0.03 to 0.15.

16. The method according to claim 14, further comprising mixing the lithium-transition metal composite oxide and a boron source compound to obtain a mixture, and heat treating the mixture containing boron in a range of from 150° C. to 400° C.

17. The method according to claim 14, further comprising mixing the lithium-transition metal composite oxide, a lithium compound, and a boron source compound to obtain a mixture, and heat treating the mixture containing lithium and boron in a range of 150° C. to 400° C.

18. The method according to claim 17, wherein the mixture has a boron content of from 0.1 mol % to 3 mol % relative to the total number of moles of metals other than lithium in the lithium-transition metal composite oxide.

19. The method according to claim 18, wherein a ratio of a number of moles of nickel to the total number of moles of metal components is greater than 0.8 and less than 1.

20. The method according to claim 14, wherein the lithium-transition metal composite oxide has a composition represented by a formula below:

$$Li_p Ni_x Co_y Mn_z M^1_w O_2$$

wherein $1 \leq p \leq 1.15$, $0.8 < x < 1$, $0 < y < 0.2$, $0 < z < 0.2$, $0 \leq w \leq 0.1$, $x+y+z+w \leq 1$, $0 < z/(y+z) < 0.58$; and $M^1$ is at least one selected from the group consisting of Al, B, Na, Mg, Si, P, S, K, Ca, Ti, V, Cr, Zn, Sr, Y, Zr, Nb, Mo, In, Sn, Ba, La, Ce, Nd, Sm, Eu, and Gd.

* * * * *

UNITED STATES PATENT AND TRADEMARK OFFICE
CERTIFICATE OF CORRECTION

| | | |
|---|---|---|
| PATENT NO. | : 12,080,885 B2 | Page 1 of 1 |
| APPLICATION NO. | : 18/046905 | |
| DATED | : September 3, 2024 | |
| INVENTOR(S) | : Katsuyuki Kitano et al. | |

It is certified that error appears in the above-identified patent and that said Letters Patent is hereby corrected as shown below:

On the Title Page

Column 1, please add under (*) Notice:
--This patent is subject to a terminal disclaimer.--

Item (45) should read:
* Sep. 3, 2024

Signed and Sealed this
Third Day of December, 2024

Katherine Kelly Vidal
*Director of the United States Patent and Trademark Office*